United States Patent
Hilleren et al.

(10) Patent No.: US 11,614,199 B2
(45) Date of Patent: *Mar. 28, 2023

(54) VERTICALLY ADJUSTABLE PEDESTAL FOR BOAT ACCESSORY

(71) Applicant: Brunswick Corporation, Mettawa, IL (US)

(72) Inventors: Derek E. Hilleren, Saint Paul, MN (US); Brian C. Leja, Rockford, MI (US); Perin E. Truax, Caledonia, MI (US); Christopher C. Eckes, Woodbury, MN (US); Todd W. Moore, Rosemount, MN (US); Christopher P. Quiring, Hastings, MN (US)

(73) Assignee: Brunswick Corporation, Mettawa, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/234,174

(22) Filed: Apr. 19, 2021

(65) Prior Publication Data
US 2021/0237830 A1    Aug. 5, 2021

Related U.S. Application Data

(63) Continuation-in-part of application No. 16/423,628, filed on May 28, 2019, now Pat. No. 11,028,963.

(51) Int. Cl.
*F16M 11/28* (2006.01)
*B63B 29/04* (2006.01)
*B63B 29/06* (2006.01)

(52) U.S. Cl.
CPC .............. *F16M 11/28* (2013.01); *B63B 29/06* (2013.01); *B63B 2029/043* (2013.01); *B63B 2029/046* (2013.01)

(58) Field of Classification Search
CPC ....... F16M 11/28; F16B 7/1472; B63B 29/04; B63B 29/06; B63B 2029/043;
(Continued)

(56) References Cited

U.S. PATENT DOCUMENTS 3,069,124 A    12/1962    Roberts
3,353,875 A    11/1967    Karge
(Continued)

FOREIGN PATENT DOCUMENTS

BE    750073 A    10/1970
BR    PI0900256 A2    10/2010
(Continued)

OTHER PUBLICATIONS

Property Information, Young's Modulus and Specific Stiffness, Mar. 19, 2018, https://web.archive.org/web/20180319212508/http://www-materials.eng.cam.ac.uk/mpsite/properties/non-IE/stiffness.html, (Year: 2018).

(Continued)

*Primary Examiner* — Jonathan Liu
*Assistant Examiner* — Guang H Guan
(74) *Attorney, Agent, or Firm* — Andrus Intellectual Property Law, LLP (57) ABSTRACT

A vertically adjustable pedestal for a boat accessory includes a hollow outer column and an inner column positioned within the outer column. The inner and outer columns are longitudinally slidable with respect to one another. A plate is captured between the inner and outer columns. The plate is laterally adjustable to create a frictional force between the inner and outer columns that prevents lateral movement therebetween. One of the inner and outer columns is configured to be coupled to a supporting surface of a boat. The other of the inner and outer columns is configured to be coupled to the boat accessory. A lifting actuator is provided (Continued)

with an extender rod having an anti-buckling plate provided thereabout. The lifting actuator raises and lowers the inner or outer column that is coupled to the boat accessory.

19 Claims, 8 Drawing Sheets

(58) Field of Classification Search
CPC ..... B63B 2029/046; B63B 17/00; A43C 3/28; A43C 3/30; A43C 3/40; A47B 2009/086; A47B 9/083; A47B 9/20; F16C 29/0692; A47C 3/28; A47C 3/30; A47C 3/40
See application file for complete search history.

(56) References Cited

U.S. PATENT DOCUMENTS

| | | | |
|---|---|---|---|
| 3,664,200 A | 5/1972 | Ter Brugge | |
| 3,828,694 A * | 8/1974 | Nestler | A47B 27/14 |
| | | | 188/300 |
| 4,357,785 A | 11/1982 | Eklund | |
| 4,635,492 A * | 1/1987 | Uebelhart | A47B 9/20 |
| | | | 248/405 |
| 4,673,155 A | 6/1987 | Binder | |
| 4,753,409 A | 6/1988 | Wilcox | |
| 5,244,253 A | 9/1993 | Hollington et al. | |
| 5,279,084 A * | 1/1994 | Atsukawa | B66F 13/005 |
| | | | 52/118 |
| 5,385,323 A | 1/1995 | Garelick | |
| 5,431,362 A | 7/1995 | Carnahan et al. | |
| 5,882,076 A | 3/1999 | Garelick et al. | |
| 6,012,775 A | 1/2000 | Czarnecki | |
| 6,079,786 A | 6/2000 | Kirkland et al. | |
| 6,189,843 B1 | 2/2001 | Pfister | |
| 6,368,225 B1 | 4/2002 | Breese et al. | |
| 6,378,816 B1 | 4/2002 | Pfister | |
| 6,494,005 B2 * | 12/2002 | Zimmerman | B66F 7/025 |
| | | | 254/420 |
| 6,663,057 B2 | 12/2003 | Garelick et al. | |
| 6,877,811 B1 | 4/2005 | Garelick | |
| 7,017,872 B2 | 3/2006 | Hogle et al. | |
| 8,357,169 B2 | 1/2013 | Henniges | |
| 8,430,218 B2 | 4/2013 | Klinke | |
| 9,247,806 B2 | 2/2016 | Lorenzen et al. | |
| 9,326,608 B1 | 5/2016 | Hoy et al. | |
| 9,366,379 B2 | 6/2016 | Bowman et al. | |
| 9,376,159 B2 | 6/2016 | Kuo | |
| 9,435,364 B2 | 9/2016 | Wang | |
| 9,599,153 B2 | 3/2017 | Aldrich | |
| 9,743,755 B2 | 8/2017 | Lin | |
| 9,788,647 B2 * | 10/2017 | Joshi | A47B 23/046 |
| 10,004,326 B2 | 6/2018 | Randlov et al. | |
| 10,041,624 B2 | 8/2018 | Christen et al. | |
| 10,107,448 B1 | 10/2018 | Hung | |
| 10,342,327 B2 | 7/2019 | Lin et al. | |
| 10,393,163 B2 | 8/2019 | Ucgun | |
| 10,512,334 B1 | 12/2019 | Koh | |
| 10,632,876 B2 * | 4/2020 | Charboneau | B60N 2/14 |
| 11,028,963 B2 * | 6/2021 | Hilleren | A47C 3/40 |
| 2002/0162410 A1 * | 11/2002 | Zimmerman | F16H 25/20 |
| | | | 74/89.35 |
| 2007/0216209 A1 | 9/2007 | Kuenzel et al. | |
| 2007/0252919 A1 * | 11/2007 | McGreevy | F16M 11/28 |
| | | | 348/825 |
| 2009/0314919 A1 | 12/2009 | Toffolo et al. | |
| 2020/0375361 A1 | 12/2020 | Hilleren et al. | |
| 2021/0237830 A1 * | 8/2021 | Hilleren | A47C 3/40 |

FOREIGN PATENT DOCUMENTS

| | | |
|---|---|---|
| CA | 2061379 A | 2/1993 |
| CA | 2236732 A1 | 11/1998 |
| CH | 664434 A5 | 2/1988 |
| CN | 101105982 A | 1/2008 |
| CN | 102217852 A | 10/2011 |
| CN | 102653310 A | 9/2012 |
| CN | 202529114 U | 11/2012 |
| CN | 106401450 A | 2/2017 |
| CN | 106510189 A | 3/2017 |
| CN | 207129097 U | 3/2018 |
| CN | 108044365 A | 5/2018 |
| CN | 207555087 U | 6/2018 |
| DE | 102015205355 A1 | 9/2016 |
| DE | 202018102210 U1 | 5/2018 |
| WO | 2012103195 A1 | 8/2012 |
| WO | 2015194268 A1 | 12/2015 |

OTHER PUBLICATIONS

Office Action and Search Report in Chinese Application No. 202010207040.9, dated Feb. 28, 2022, 6 pages, and English translation, 5 pages.

* cited by examiner

VERTICALLY ADJUSTABLE PEDESTAL FOR BOAT ACCESSORY

CROSS-REFERENCE TO RELATED APPLICATION

The present application is a continuation-in-part of U.S. application Ser. No. 16/423,628, filed May 28, 2019, the entirety of which is hereby incorporated herein by reference.

FIELD

The present disclosure relates to vertically adjustable pedestals for boat accessories, such as, but not limited to, tables or seats.

BACKGROUND

U.S. Pat. No. 5,385,323 discloses a pair of rigid hollow tubular members that are telescoped together with one of the members having a series of spaced-apart grooves running parallel to the axis and the other having a series of spaced-apart ribs running parallel to its axis with the ribs slidably engaged in the grooves and means for releasably applying radial force between the two tubular members to force the ribs and the grooves into tight engagement to frictionally lock the tubular members together in a very stable fashion so they support a load without wobbling yet can be released when necessary.

U.S. Pat. No. 6,663,057 discloses a vertically adjustable pedestal for a boat accessory such as a table or seat, which is made up of a pair of telescoped tubular members having opposite facing lengthwise recesses which contain rods to allow one member to adjustably slide with respect to the other yet preventing rotation. A releasable locking device holds the adjusted member at its desired elevation.

The above-noted patents are hereby incorporated herein by reference in their entireties.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

According to one example of the present disclosure, a vertically adjustable pedestal for a boat accessory includes a hollow outer column and an inner column positioned within the outer column. The inner and outer columns are slidable with respect to one another in a longitudinal direction of the pedestal. A first plate is captured between the inner and outer columns at a first location, and the first plate is laterally adjustable with respect to the inner and outer columns to create a frictional force between the inner and outer columns that prevents lateral movement therebetween. A surface of the first plate has first and second grooves therein extending in the longitudinal direction and laterally spaced from one another, and a surface of one of the inner and outer columns that faces the surface of the first plate has third and fourth grooves therein extending in the longitudinal direction and laterally spaced from one another. The first and second grooves face the third and fourth grooves, respectively. A first rod extends in the longitudinal direction and is captured within the first and third grooves. A second rod extends in the longitudinal direction and is captured within the second and fourth grooves. A second plate is captured between the inner and outer columns. A fastener contacts the first plate. The fastener is configured such that rotation thereof moves the first plate laterally to cause the inner column to wedge against the second plate and thereby adjust the frictional force between the inner and outer columns. The first and second rods are made of a material with a lower coefficient of friction than a material of which the inner and outer columns are made. One of the inner and outer columns is configured to be coupled to a supporting surface of a boat, and the other of the inner and outer columns is configured to be coupled to the boat accessory.

According to another example, a vertically adjustable pedestal for a boat accessory includes a hollow outer column comprising at least first, second, and third inner surfaces extending in a longitudinal direction of the pedestal and an inner column positioned within the outer column and comprising at least first, second, and third outer surfaces extending in the longitudinal direction and respectively facing the first, second, and third inner surfaces. A first plate is positioned between the first inner surface and the first outer surface, a second plate is positioned between the second inner surface and the second outer surface, and a third plate is positioned between the third inner surface and the third outer surface. The first plate is laterally movable to wedge the second and third outer surfaces of the inner column against the respective second and third plates on the respective second and third inner surfaces of the outer column. A fastener extends through one of the inner and outer columns and contacts the first plate. The fastener is configured such that rotation thereof moves the first plate laterally. A first rod extends in the longitudinal direction and is captured between the first plate and the first outer surface within a first groove in the first plate and a second groove in the first outer surface. A second rod extends in the longitudinal direction and is captured between the first plate and the first outer surface within a third groove in the first plate and a fourth groove in the first outer surface. The first and second rods are laterally spaced apart from one another. The first and second rods are configured to limit lateral and rotational movement of the inner and outer columns with respect to one another. The first and second rods are made of a material with a lower coefficient of friction than a material of which the inner and outer columns are made. The inner and outer columns are slidable with respect to one another in the longitudinal direction, and one of the inner and outer columns is configured to be coupled to a supporting surface of a boat, and the other of the inner and outer columns is configured to be coupled to the boat accessory.

According to another example, a vertically adjustable pedestal for a boat accessory includes a hollow outer column and an inner column positioned within the outer column. The inner and outer columns are longitudinally slidable with respect to one another. The inner column is configured to be coupled to the boat accessory, and the outer column is configured to be coupled to a supporting surface of a boat. The pedestal also includes a lifting actuator, an extension tube of which is coupled to the inner column for raising and lowering the inner column with respect to the supporting surface of the boat. An extender rod is coupled to an upper end of and longitudinally aligned with the extension tube. The extender rod is coupled between the extension tube and the inner column. An anti-buckling plate is coupled to the extender rod and has an outer perimeter. At least a portion of the outer perimeter abuts an inner perimeter of the inner column.

BRIEF DESCRIPTION OF DRAWINGS

Examples of pedestals for boat accessories are described with reference to the following Figures. The same numbers are used throughout the Figures to reference like features and like components.

DETAILED DESCRIPTION

Figure 1:
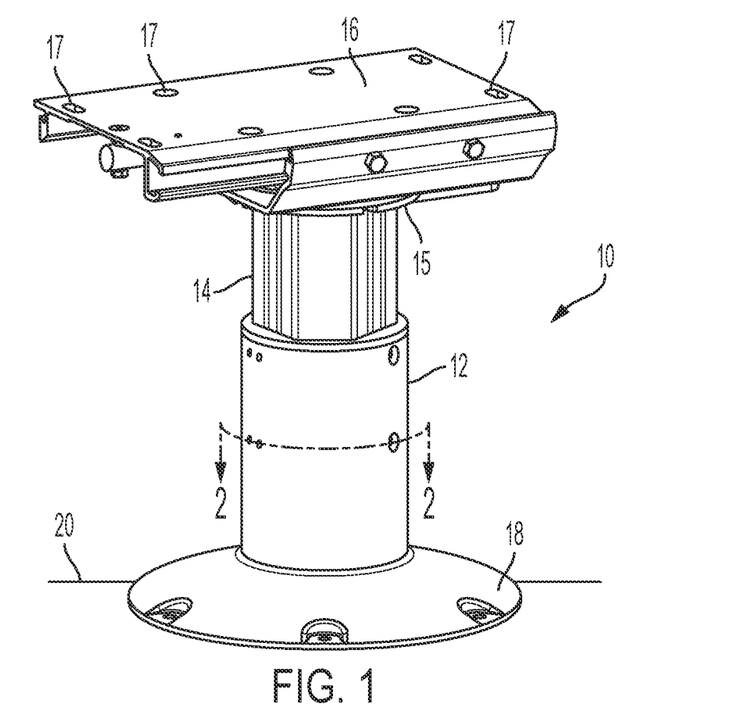
FIG. 1 illustrates a first embodiment of a pedestal for a boat accessory.

FIG. 1 illustrates a vertically adjustable pedestal 10 for a boat accessory, such as, but not limited to, a seat, table, barbeque grill, or other known boat accessory. The pedestal 10 includes a hollow outer column 12 and an inner column 14 positioned within the outer column 12. One of the inner and outer columns 14, 12 is configured to be connected to a supporting surface 20 of the boat, such as the boat deck, and the other of the inner and outer columns 14, 12 is configured to be connected to the boat accessory, such as through a support platform 16. Here, the accessory support platform 16 is coupled to a top end of the inner column 14 and includes apertures 17 for insertion of bolts that connect the support platform 16 to the boat accessory (not shown) in a known manner. A mounting plate 18 is provided around the outer column 12. The mounting plate 18 can be used to mount the pedestal 10 to the supporting surface 20 of the boat and/or to provide an aesthetically pleasing look to the pedestal 10. Although here the inner column 14 is shown as being connected to the support platform 16, and the outer column 12 is shown as being connected to the supporting surface 20 of the boat, it should be understood that these connections may be reversed in alternative embodiments. In either embodiment, however, the inner and outer columns 14, 12 are longitudinally slidable with respect to one another, so as to adjust a height of the support platform 16 with respect to the supporting surface 20 of the boat.

Figure 2:
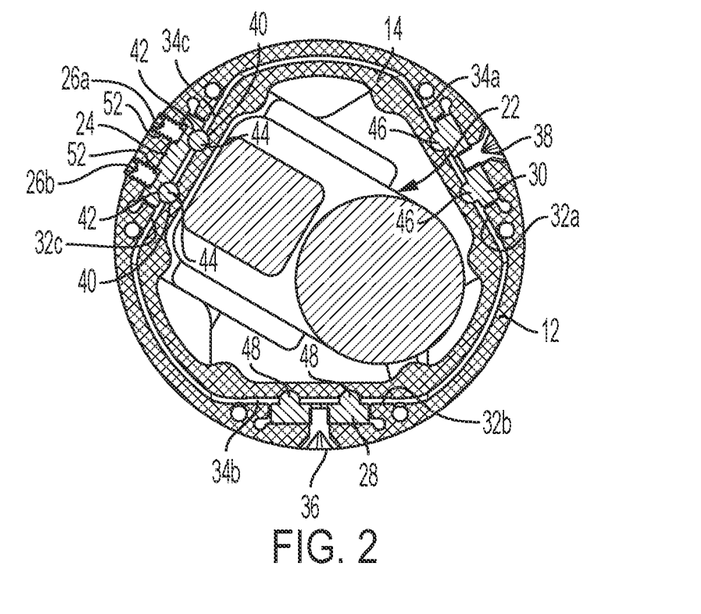
FIG. 2 illustrates a cross section of the first embodiment of the pedestal, taken along the line 2-2 in FIG. 1.

FIG. 2 shows a cross sectional view through the inner and outer columns 14, 12 of the pedestal 10, taken along the line 2-2 in FIG. 1. A lifting actuator 22 is shown within the hollow of the inner column 14. The lifting actuator 22 may be supported on the mounting plate 18 of the pedestal 10 or may be located underneath the supporting surface 20 of the boat. The lifting actuator 22 has a movable end that is coupled to the inner column 14 for raising and lowering the inner column 14 with respect to the outer column 12. The lifting actuator 22 could be a gas spring, an electric linear actuator, a hydraulic piston-cylinder, or any other actuator known to those having ordinary skill in the art, and can be actuated by a push button. The manner in which the movable end of the lifting actuator 22 is coupled to the inner column 14 can be accomplished in any way known to those having ordinary skill in the art, such as by being bolted, screwed, or otherwise fastened to a top plate 15 (FIG. 1) connected to the inner column 14 or to a block connected to the support platform 16. Extension of the movable end of the lifting actuator 22 away from the supporting surface 20 of the boat raises the inner column 14 within the outer column 12, while retraction of the movable end of the lifting actuator 22 toward the supporting surface 20 of the boat lowers the inner column 14 within the outer column 12.

According to the present disclosure, the inner column 14 has at least one longitudinally extending planar outer surface facing a corresponding longitudinally extending planar inner surface of the outer column 12. Here, the hollow outer column 12 comprises at least three longitudinally extending planar inner surfaces 32a, 32b, 32c, and the inner column 14 comprises at least three longitudinally extending planar outer surfaces 34a, 34b, 34c respectively facing the inner surfaces 32a, 32b, 32c. These surfaces 32a, 32b, 32c and 34a, 34b, 34c roughly take the shape of triangles when viewed in cross-section, although the corners of the "triangles" are radiused/rounded to match the cylindrical outer surface of the outer column 12. In other embodiments, the inner and outer columns 14, 12 could have other cross-sectional shapes, such as shapes with four or more sides or a circular shape.

Figure 3:
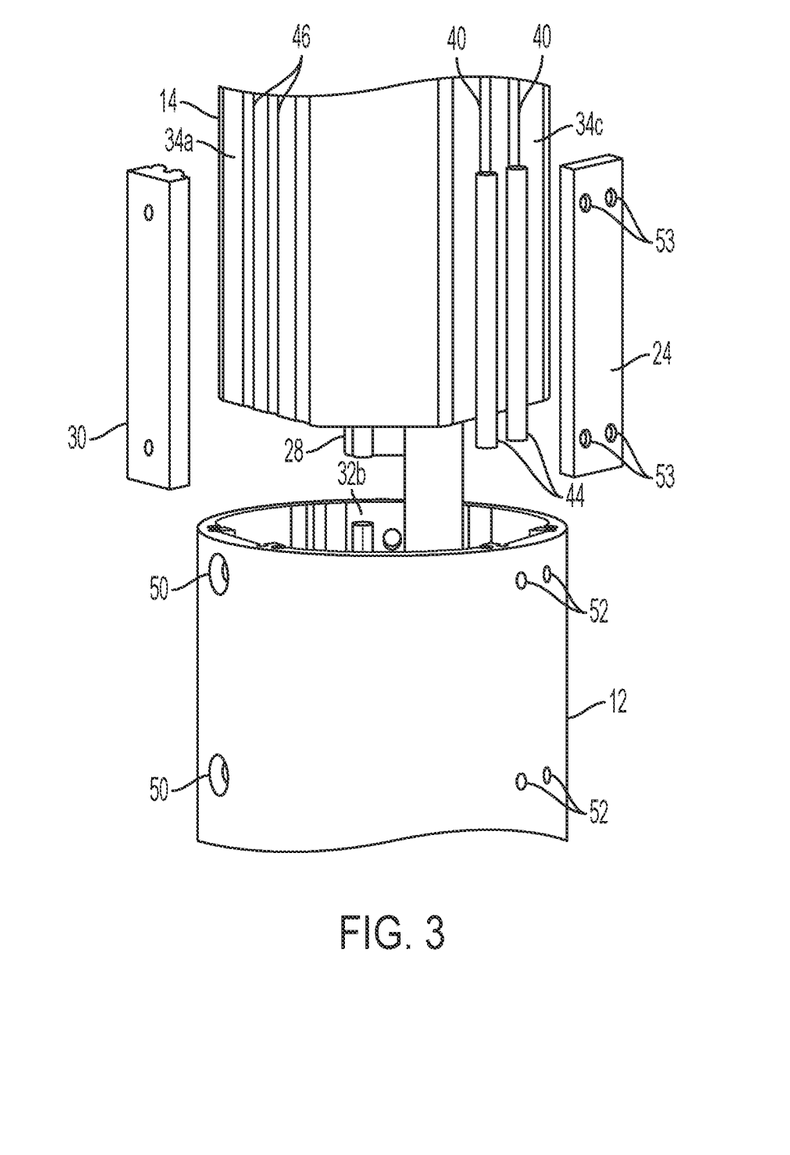
FIG. 3 illustrates an exploded view of a portion of the pedestal of FIG. 1.

Referring to FIGS. 2 and 3, a plate 24 is captured between the inner and outer columns 14, 12. The plate 24 is adjustable to create (e.g., increase) a frictional force between the inner and outer columns 14, 12. The frictional force, once it reaches a threshold, prevents lateral movement of the inner and outer columns 14, 12 with respect to one another, which would otherwise make the pedestal 10 feel wobbly. In the present example, the plate 24 is laterally adjustable to create the frictional force. To provide for such lateral adjustment, fasteners 26a, 26b, such as set screws, extend through threaded holes 52 in the outer column 12 and contact the plate 24 at indentations 53. Rotation of the fasteners 26a, 26b within threaded holes 52 moves the plate 24 laterally to adjust the frictional force between the inner and outer columns 14, 12. Specifically, rotation of the fasteners 26a, 26b in a direction tending to tighten the fasteners 26a, 26b within threaded holes 52 (i.e., move the fasteners 26a, 26b radially inwardly toward the inner column 14) moves the plate 24 radially inwardly toward the inner column 14 and increases the frictional force between the inner and outer columns 14, 12. Conversely, rotation of the fasteners 26a, 26b in a direction tending to loosen the fasteners 26a, 26b within threaded holes 52 lessens force on the plate 24, which allows the plate 24 to move radially outwardly with respect to the inner column 14, thereby decreasing the frictional force between the inner and outer columns 14, 12.

As shown in FIG. 2, the plate 24 is positioned between one of the inner surfaces (here, inner surface 32c) of the outer column 12 and a respective one of the outer surfaces (here, outer surface 34c) of the inner column 14. Lateral movement of the plate 24 in a radially inward direction, caused by tightening of the fasteners 26a, 26b within threaded holes 52, moves the inner column 14 laterally and wedges the remaining outer surfaces 34a, 34b of the inner column 14 against the respective remaining inner surfaces 32a, 32b of the outer column 12. Such wedging together of the planar inner surfaces 32a, 32b and planar outer surfaces 34a, 34b creates the threshold friction necessary to prevent wobble of the inner column 14 with respect to the outer column 12.

An additional plate 28 is captured between the inner and outer columns 14, 12 at a different location than that of the plate 24. Another additional plate 30 is captured between the inner and outer columns 14, 12 at a still different location. The plates 24, 28, 30 are respectively captured between the planar outer surfaces 34a, 34b, 34c of the inner column 14 and the planar inner surfaces 32a, 32b, 32c of the outer column 12. The additional plates 28, 30 are shown as not being laterally adjustable with respect to the inner and outer columns 14, 12. More specifically, the additional plate 28 is fixed to the inner surface 32b of the outer column 12 by way of a bolt 36, and the additional plate 30 is fixed to the inner surface 32a of the outer column 12 by way of a bolt 38; however, any fixed fasteners could be used. Note that although the additional plates 28, 30 are shown as being fixed with respect to the outer column 12, the additional plates 28, 30 could instead be laterally movable, such as if the arrangement of the set screw-type fasteners 26a, 26b and plate 24 were provided at these locations. However, it is acceptable for the additional plates 28, 30 to be fixed, as they serve as a surface against which the outer surfaces 34a, 34b of the inner column 14 can wedge. Additionally, according to the present disclosure, the additional plates 28, 30 may be made of a material with a lower coefficient of friction than a material of which the inner and outer columns 14, 12 are made. This way, the inner column 14 can slide easily with respect to the outer column 12 under the power of the lifting actuator 22.

Figure 6:
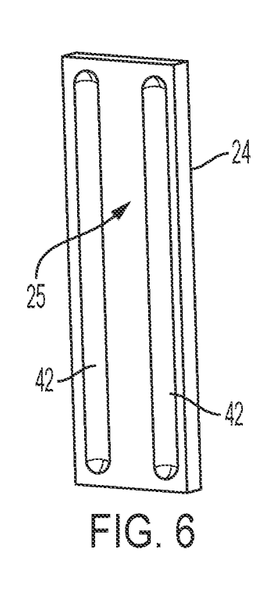
FIG. 6 illustrates another plate for use with the pedestal of FIG. 1.

According to the present disclosure, at least one of the plates 24, 28, 30 is attached to one of the inner and outer surfaces 32a, 32b, 32c and 34a, 34b, 34c of the respective outer and inner columns 12, 14 (here, to the inner surfaces 32a, 32b, 32c of the outer column 12) and has a surface irregularity facing the other of the inner and outer surfaces 32a, 32b, 32c and 34a, 34b, 34c. The other of the inner and outer surfaces 32a, 32b, 32c and 34a, 34b, 34c of the respective outer and inner columns 12, 14 has a corresponding surface irregularity. The surface irregularities are configured to limit lateral and rotational movement of the inner and outer columns 14, 12, with respect to one another. In one example, the surface irregularities comprise longitudinally extending grooves. More specifically, referring now also to FIGS. 3 and 6, a surface of at least one of the plate 24 and the additional plates 28, 30 has a first longitudinally aligned groove therein, and a facing surface of at least one of the inner and outer columns 14, 12 has a second longitudinally aligned groove therein, the first and second grooves facing one another. Here, two grooves 42 are formed in a surface 25 of the plate 24 that faces the inner column 14. Corresponding grooves 40 are formed on the outer surface 34c of the inner column 14. A longitudinally aligned rod is captured within the first and second longitudinally aligned grooves. More specifically, here, two rods 44 are captured within the longitudinally aligned grooves 40, 42, between the surface 25 of the plate 24 and the outer surface 34c of the inner column 14. The rods 44 are made of a material with a lower coefficient of friction than the material of which the inner and outer columns 14, 12 are made to facilitate sliding of the inner column 14 with respect to the outer column 12 under the power of the lifting actuator 22.

Figure 5:
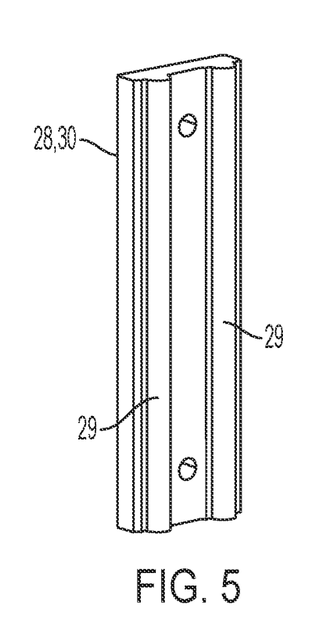
FIG. 5 illustrates a plate for use with the pedestal of FIG. 1.

In the above-described example, the surface irregularities on the plate 24 are the grooves 42, and the surface irregularities on the outer surface 34c of the inner column 14 are the grooves 40. The rods 44 captured within these grooves 40, 42 limit lateral and rotational movement of the inner and outer columns 14, 12 with respect to one another by providing a shear force in response to any lateral or rotational force applied to the pedestal 10. In another example, the surface irregularities can be built into the plate(s) 24, 28, 30 themselves. For example, the outer surfaces 34a, 34b of the inner column 14 each have grooves 46, 48, but the surface irregularities on the plates 28, 30 comprise longitudinally extending protrusions 29 (FIG. 5) that are integral with the plates 28, 30 themselves. However, it should be understood that the additional plates 28, 30 could instead also have grooves provided therein, and separate rods (similar to rods 44) could be provided for situating between the grooves in the plates 28, 30 and the grooves 46, 48 in the outer surfaces 34a, 34b of the inner column 14. For example, see FIG. 8, described further herein below. Thus, the rods 44 may be integral with or separate components from the at least one of the plate 24 and the additional plates 28, 30. In one example, the rods 44 are integrally attached to the plate 24, such as by way of overmolding. In another example, the rods 44 are held in place in the grooves 40, 42 simply by being captured between the inner and outer columns 14, 12. Those having ordinary skill in the art would understand that the rods 44 need not have the cylindrical shape shown herein, but could have another cross-sectional shape, such as ovular, rectangular, or square.

Figure 4:
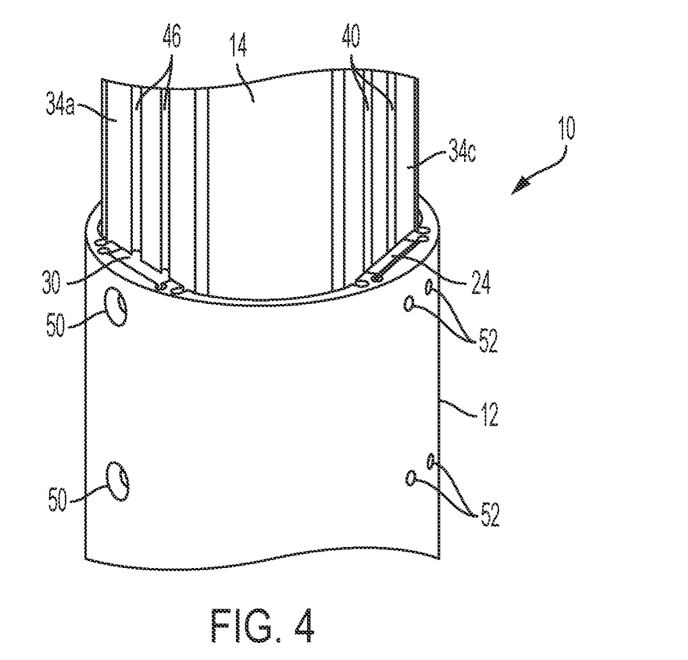
FIG. 4 illustrates a view of the same portion of the pedestal when it is assembled.

Now turning to FIG. 4, an assembled close-up view of the pedestal 10 will be described. To assemble the pedestal 10, the additional plates 28, 30 may be bolted to the outer column 12, such as by inserting bolts 36, 38 (FIG. 2) through bolt holes, two of which are shown at 50 in FIG. 4. The inner column 14 can be then slid downwardly into the hollow outer column 12, and the rods 44 and plate 24 inserted into the gap between the inner and outer columns 14, 12, with the rods 44 situated in the grooves 40 in the outer surface 34c of the inner column 14. Four fasteners (such as 26a, 26b, FIG. 2) can then be inserted into the threaded holes 52 and tightened to push against the plate 24 and move the plate 24 laterally towards the inner column 14. To provide the above-noted wedging action, the laterally movable plate 24 may be made of a material that is stiffer than a material of which the additional plates 28, 30 are made. For instance, the laterally movable plate 24 may be made of stainless steel or another rigid material that will not bend or otherwise deform at the locations where fasteners 26a, 26b are tightened against it, such that the entire plate 24 can provide a pushing force against the inner column 14. The additional plates 28, 30 can be made of a material having a lower coefficient of friction than the laterally movable plate 24 (and, as noted above, than that of the inner and outer columns 14, 12), such as acetal (Polyoxymethylene/POM). One such acetal is a homopolymer resin sold under the tradename DELRIN™ by Dupont. The rods 44 may also be made of acetal homopolymer resin, in order to facilitate sliding of the inner column 14 with respect to the outer column 12 under the power of the lifting actuator 22. In another example, such as the one in which the additional plates 28, 30 have grooves like the plate 24, the additional plates 28, 30 can be made of a material stiffer than acetal, but less stiff than stainless steel, such as for example aluminum. In this case, the rods inserted in the grooves in the additional plates 28, 30 can be made of, for example, acetal.

In this example, the fasteners 26a, 26b extend through the outer column 12, and heads of the fasteners 26a, 26b are accessible from outside the pedestal 10 so as to allow a user to adjust the tightness of the plate 24 against the inner column 14. Such user adjustment might be necessary, after initial adjustment at the factory, if the inner column 14 starts to wobble with respect to the outer column 12 over time and after repeated use. However, because the inner column 14 is also hollow, note that the fasteners 26a, 26b could extend through either one of the inner or outer columns 14, 12; if the fasteners 26a, 26b extended through the outer surface 34c of the inner column 14, the plate 24 would then instead wedge against the inner surface 32c of the outer column 12 to create the frictional force. Note that in this alternative embodiment, the plates 28, 30 could be bolted to the outer surfaces 34a, 34b of the inner column 14. It should be understood that the grooves would then be provided in the inner surfaces 32a, 32b, 32c of the outer column 12, instead of on the outer surfaces 34a, 34b, 34c of the inner column 14.

Although the plates 24, 28, 30 are shown herein as being planar, they could instead have a cupped shape if the diameter of the inner column 14 was small enough to allow for adequate gripping thereof by the plates. In that instance, the inner column 14 would have a corresponding cylindrical outer surface for the plates 24, 28, 30 to contact.

Figure 7:
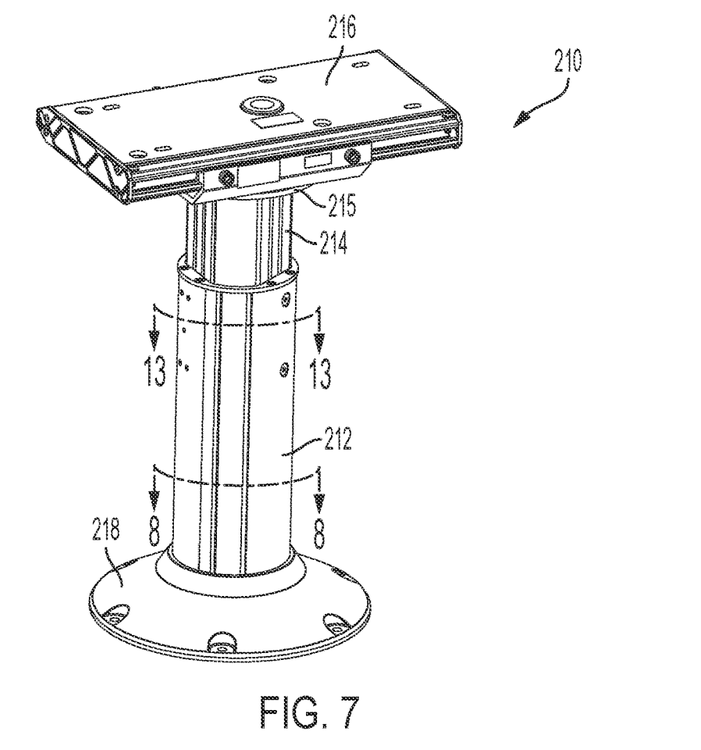
FIG. 7 illustrates a second embodiment of a pedestal for a boat accessory.
Figure 8:
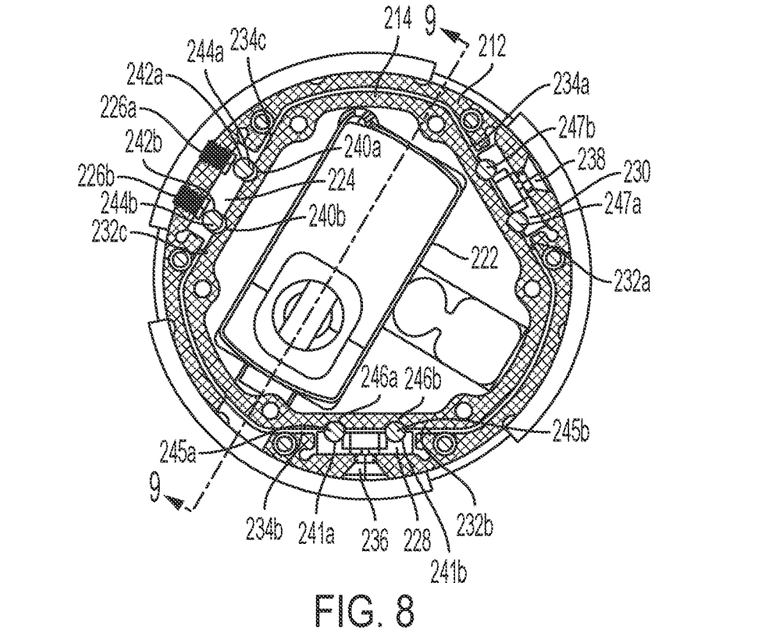
FIG. 8 illustrates a cross section of the second embodiment of the pedestal, taken along the line 8-8 in FIG. 7.

FIGS. 7 and 8 illustrate a second embodiment of a vertically adjustable pedestal 210 for a boat accessory. Generally, the components and functioning of the pedestal 210 are the same as those of the pedestal 10, expect where specifically noted herein below. Like components are therefore labeled with a "2" in front of the reference numbers used to describe the first embodiment. The pedestal 210 includes a hollow outer column 212 comprising at least first, second, and third inner surfaces 232a-c extending in a longitudinal direction of the pedestal 210 and an inner column 214 positioned within the outer column 212 and comprising at least first, second, and third outer surfaces 234a-c extending in the longitudinal direction and respectively facing the first, second, and third inner surfaces 232a-c. A first plate 224 is positioned between the first inner surface 232c and the first outer surface 234c, a second plate 228 is positioned between the second inner surface 232b and the second outer surface 234b, and a third plate 230 is positioned between the third inner surface 232a and the third outer surface 234a. The first plate 224 is laterally movable to wedge the second and third outer surfaces 234b, 234a of the inner column 214 against the respective second and third plates 228, 230 on the respective second and third inner surfaces 232b, 232a of the outer column 212. Fasteners 226a, 226b extend through the outer column 212 and contact the first plate 224. The fasteners 226a, 226b are configured such that rotation thereof moves the first plate 224 laterally to provide such wedging action, as described hereinabove with respect to plate 24. The second and third plates 228, 230 are fixed to the outer column 212 by bolts 236, 238, respectively, but in alternative embodiments, one or both plates 228, 230 could also be movable like plate 224.

As with the first embodiment, the inner and outer columns 214, 212 are slidable with respect to one another in the longitudinal direction of the pedestal 210, and one of the inner and outer columns 214, 212 is configured to be coupled to a supporting surface of a boat (here, the outer column 212, by way of mounting plate 218), and the other of the inner and outer columns 214, 212 is configured to be coupled to the boat accessory (here, the inner column 214 by way of top plate 215 and platform 216). To facilitate such longitudinal sliding, a first rod 244a extends in the longitudinal direction and is captured between the first plate 224 and the first outer surface 234c within a first groove 242a in the first plate 224 and a second groove 240a in the first outer surface 234c. A second rod 244b extends in the longitudinal direction and is captured between the first plate 224 and the first outer surface 234c within a third groove 242b in the first plate 224 and a fourth groove 240b in the first outer surface 234c. The first and second rods 244a, 244b are made of a material with a lower coefficient of friction than a material of which the inner and outer columns 214, 212 are made to facilitate sliding therebetween. Furthermore, the first and second rods 244a, 244b are laterally spaced apart from one another. By virtue of this lateral spacing and their placement within facing grooves 240a, 242a and 240b, 242b, respectively, the first and second rods 244a, 244b are configured to limit lateral and rotational movement of the inner and outer columns 214, 212 with respect to one another.

A surface of the second plate 228 has fifth and sixth grooves 241a, 241b therein extending in the longitudinal direction and laterally spaced from one another. A surface of one of the inner and outer columns 214, 212 that faces the surface of the second plate 228 has seventh and eighth grooves 246a, 246b therein extending in the longitudinal direction and laterally spaced from one another, the fifth and sixth grooves 241a, 241b facing the seventh and eighth grooves 246a, 246b, respectively. A third rod 245a extends in the longitudinal direction and is captured within the fifth and seventh grooves 241a, 246a, and a fourth rod 245b extends in the longitudinal direction and is captured within the sixth and eighth grooves 241b, 246b. The third and fourth rods 245a, 245b are made of a material having a lower coefficient of friction than the material of which the inner and outer columns 214, 212 are made to facilitate sliding therebetween. By virtue of their lateral spacing and their placement within facing grooves 241a, 246a and 241b, 246b, respectively, the third and fourth rods 245a, 245b are configured to limit lateral and rotational movement of the inner and outer columns 214, 212 with respect to one another. Note that the same general description applies to the third plate 230 and third outer surface 234a of the inner column 214, between which low-friction rods 247a, 247b are also wedged, although it will not be provided herein for the sake of brevity.

In one example, the first plate 224 is made of a material that is stiffer than a material of which the second and third plates 228, 230 are made. For example, the first plate 224 could be made of stainless steel, as noted above, and the second and third plates 228, 230 could be made of aluminum. In other examples, all the plates 224, 228, 230 are made of stainless steel, all are made of aluminum, or all are made of another suitable metal. While it is noted herein above that the rods 244a, 244b, 245a, 245b, 247a, 247b are made of a material having a lower coefficient of friction than that of the inner and outer columns 214, 212 (e.g., acetal homopolymer), it should also be noted that not all of the rods need to be made of the same material as one another. For example, some or all of the rods could be made of polytetrafluoroethylene or a nylon-based polymer. In general, the polymer of which the rods are made has a lower coefficient of friction than that of the inner and outer columns 214, 212 to facilitate sliding therebetween under the power of the lifting actuator 222, while also being strong enough to withstand shear forces to prevent the inner and outer columns 214, 212 from rotating with respect to one another in response to rotational loads.

Figure 9:
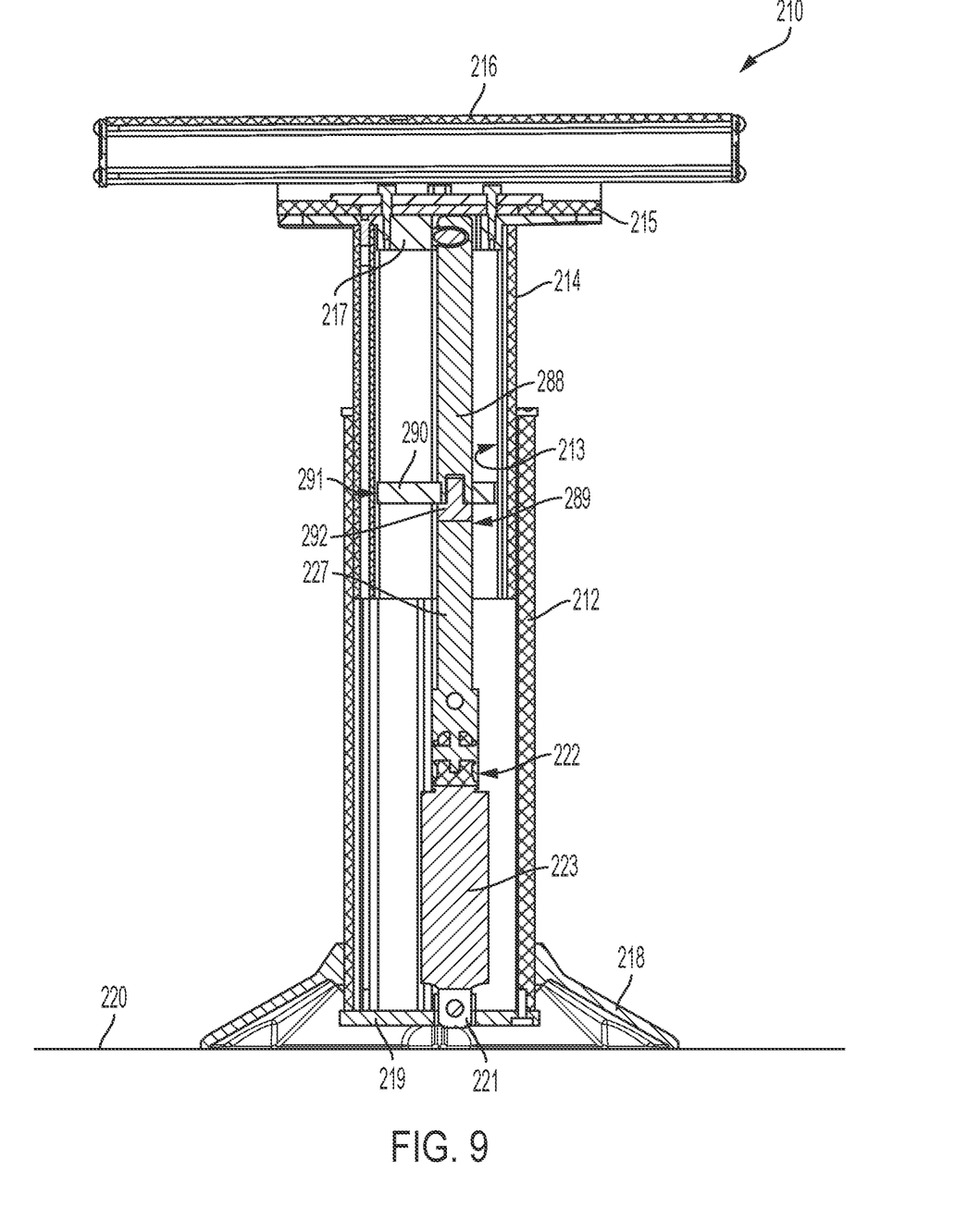
FIG. 9 illustrates another cross section of the second embodiment of the pedestal, taken along the line 9-9 in FIG. 8.

FIG. 9 shows a longitudinal cross section of the pedestal 210. The lifting actuator 222 is provided in the form of a typical electric linear actuator having an outer tube 223 and an extension tube 227 that is extensible from and retractable into to the outer tube 223 under the power of an electric motor. A hydraulic or pneumatic actuator could instead be used. The extension tube 227 is coupled to the inner column 214 of the pedestal 210, as will be described below, such that the extension tube 227 moves in the longitudinal direction of the pedestal 210. The lifting actuator 222 is configured to raise and lower the inner column 214 with respect to the outer column 212 to change the height of the platform 216 (and thus the marine accessory supported thereupon) with respect to the supporting surface 220 as the extension tube 227 is extended from and retracted into the outer tube 223.

A lower end fitting 221 of the lifting actuator 222 is bolted, pinned, or otherwise attached to a support plate 219, which is in turn bolted, screwed, or otherwise attached to the lower end of the outer column 212. The mounting plate 218 is welded to the outer column 212, further reinforcing the connections at the lower end of the outer column 212. At the opposite end of the lifting actuator 222, an extender rod 288 is coupled to an upper end 289 of and longitudinally aligned with the extension tube 227. The extender rod 288 is coupled between the extension tube 227 and the inner column 214, more specifically, by being bolted, pinned, or otherwise attached to a downwardly extending neck 217 of the top plate 215, which neck 217 fits inside the inner perimeter 213 of the inner column 214. An anti-buckling plate 290 is coupled to the extender rod 288 and has an outer perimeter 291. At least a portion of the outer perimeter 291 abuts the inner perimeter 213 of the inner column 214.

Figure 10:
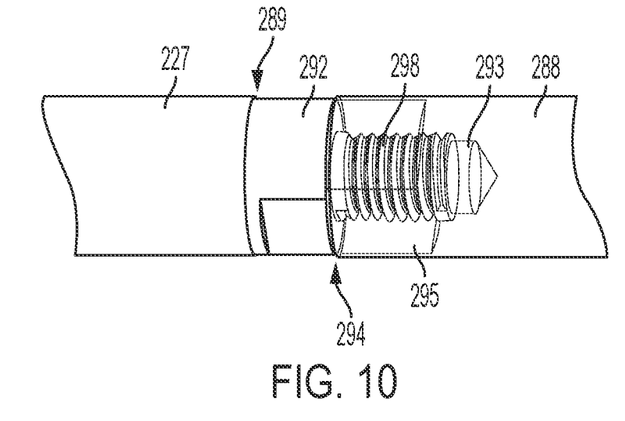
FIG. 10 illustrates a connection, partially in phantom, between a lifting actuator for use in the pedestals and an extender rod for accommodating different heights of pedestals.
Figure 11:
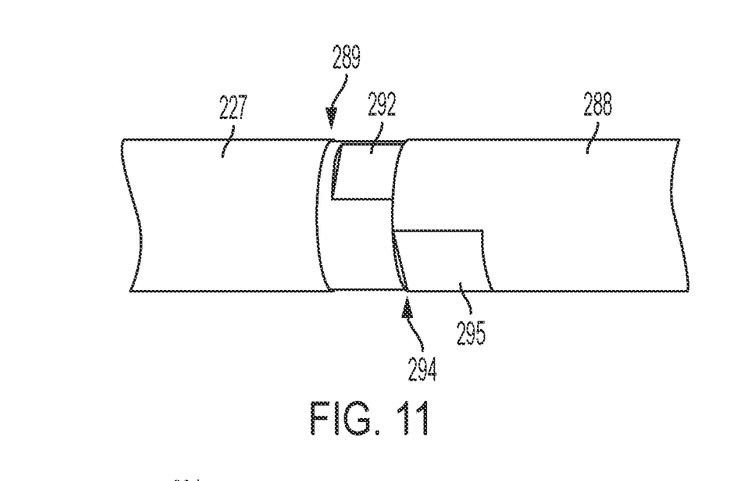
FIG. 11 illustrates the connection between the lifting actuator and the extender rod as viewed from the outside thereof.
Figure 12:
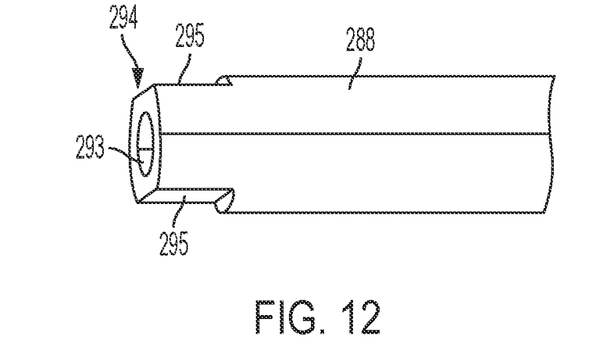
FIG. 12 illustrates a lower end of the extender rod.

FIGS. 10-12 show details of the connection of the extension tube 227 to the extender rod 288. A threaded adapter 292 with threads 298 is provided at the upper end 289 of the extension tube 227. The threaded adapter 292 may be one provided as part of the lifting actuator 222, but could instead be a part specifically machined for the present purposes. The extender rod 288 is a cylindrical rod made of, for example, aluminum or steel, but could have another appropriate shape. The lower end 294 of the extender rod 288 has a mating threaded surface, here, inside bore 293, configured to be connected to the threads 298 on the threaded adapter 292. Although here the adapter 292 is shown as the male component and the threaded bore 293 as the female component, in other examples, the genders of the ends of the components could be reversed. Furthermore, other types of connections between the upper end 289 of the extension tube 227 of the lifting actuator 222 and the lower end 294 of the extender rod 288 besides a threaded one could be used, such as a splined connection, an adhered connection, or a sleeved connection.

Figure 13:
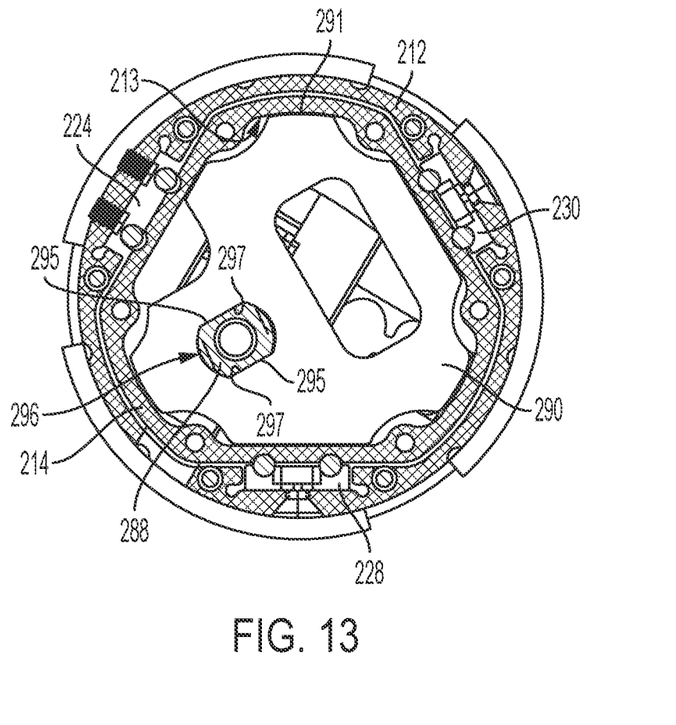
FIG. 13 illustrates another cross section of the second embodiment of the pedestal, taken along the line 13-13 in FIG. 7.
Figure 14:
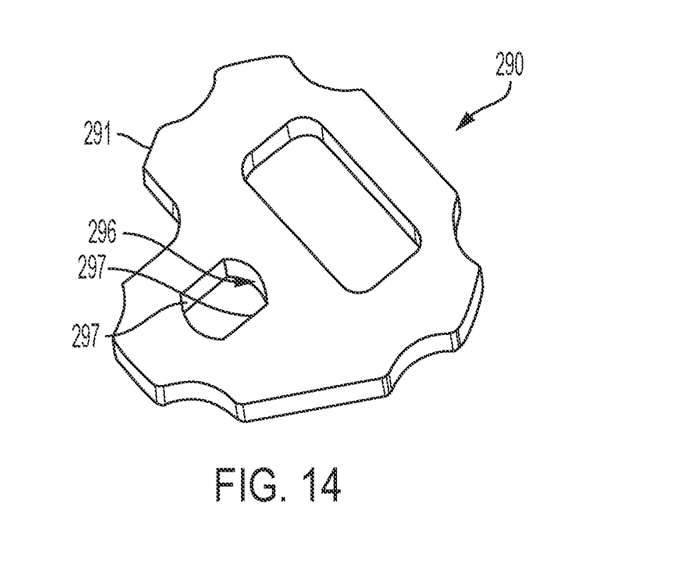
FIG. 14 illustrates an anti-buckling plate for use in the pedestals of the present disclosure.

Before the threaded adapter 292 of the lifting actuator 222 and the lower end 294 of the extender rod 288 are connected, the anti-buckling plate 290 is provided on the lower end 294 of the extender rod 288. To orient the parts correctly, the lower end 294 of the extender rod 288 has a locating surface feature thereon, such as the two flats 295 shown here. Referring to FIGS. 13 and 14, the anti-buckling plate 290 has an aperture 296 extending therethrough configured to receive the lower end 294 of the extender rod 288. The aperture 296 has a locating surface feature (here, two flats 297) configured to align with the corresponding locating surface feature (flats 295) on the outside surface of the extender rod 288, which has the same cross-sectional shape as and a slightly smaller size than the aperture 296. Returning to FIG. 11, note how flats on either side of the threaded adapter 292 do not align with the flats 295 on the lower end 294 of the extender rod 288. This misalignment maintains the anti-buckling plate 290 in place longitudinally within the pedestal 210, as the cross-sectional shape of the aperture 296 will not allow the anti-buckling plate 290 to slide down onto the extension tube 227 of the lifting actuator 222. The longitudinal dimension of the flats 295 meanwhile will not allow the anti-buckling plate 290 to travel further up the extender rod 288. Although the locating surface features here are shown as two flats on either side of the otherwise cylindrical aperture 296 and extender rod 288, note that other surface features could be used, such as a keyed connection.

Returning to FIGS. 13 and 14, as noted briefly hereinabove, the outer perimeter 291 of the anti-buckling plate 290 is configured to contact the inner perimeter 213 of the inner column 214, at least in a few locations. Specifically, contact between the outer perimeter 291 and the inner perimeter 213 occurs at least at three triangulated locations, such that the anti-buckling plate 290 is wedged within the inner column 214. This prevents the connected extension tube 227 and extender rod 288 from buckling in multiple directions. Buckling might otherwise be of risk due to the extended effective length of the lifting actuator 222 by virtue of addition of the extender rod 288. The anti-buckling plate 290 can be made of a polymer such as plastic or of stainless steel. Note that although the anti-buckling plate 290 is shown at the lower end 294 of the extender rod 288, it could instead by provided partway up the extender rod 288 and serve the same purpose of wedging against the inner perimeter 213 of the inner column 214 to prevent buckling of the extender rod 288. Other apertures can be provided in the anti-buckling plate 290 and/or between the outer perimeter 291 thereof and the inner perimeter 213 of the inner column 214 to accommodate wires or other connections between the lower and upper portions of the pedestal 210 and/or to allow for tools to access certain parts during assembly.

In known electric rise pedestals, when a customer desires to change the overall height limits of the pedestal, it is necessary to change the height of numerous components of the pedestal. Note that by "overall height limits," it is meant that the total height of a first pedestal with the inner column 14, 214 fully lowered is different than the total height of a second pedestal with the inner column 14, 214 fully lowered; similarly, the total height of the first pedestal with the inner column 14, 214 fully raised is different than the total height of the second pedestal with the inner column 14, 214 fully raised. For example, compare FIGS. 1 and 7, in which the height of the outer column 12 is clearly less than the height of the outer column 212. Existing pedestals have the lifting actuator 22, 222 provided below deck, mounted to a plate that is suspended from the mounting plate 18, 218 by two or more poles. If the overall height of the pedestal is changed, then the heights of the poles and the outer column 12, 212 need to change, as well as the size (i.e., linear extension limit) of the lifting actuator 22, 222. The present inventors have realized that by locating the lifting actuator 22, 222 within the outer column 12, 212 (ideally above deck) and by adding the extender rod 288 to the upper end of the extension tube 227 of the lifting actuator 22, 222, pedestals of different heights can be accommodated with the same lifting actuator used in all pedestals. This reduces the number of SKUs a pedestal manufacturer must maintain in inventory. Further, instead of being required to change the length of the two or more poles suspending the plate holding the actuator, it is necessary only to change the length of the outer column 12, 212 and the extender rod 288. Moreover, the critical joints at the connection between the lower end fitting 221 and the support plate 219, at the connection between the support plate 219 and the bottom end of the outer column 212, and at the weld between the outer column 212 and the mounting plate 218 remain the same across all pedestals, requiring less validation/testing of the design, while ensuring consistent strength and stability across pedestal heights.

Figure 15:
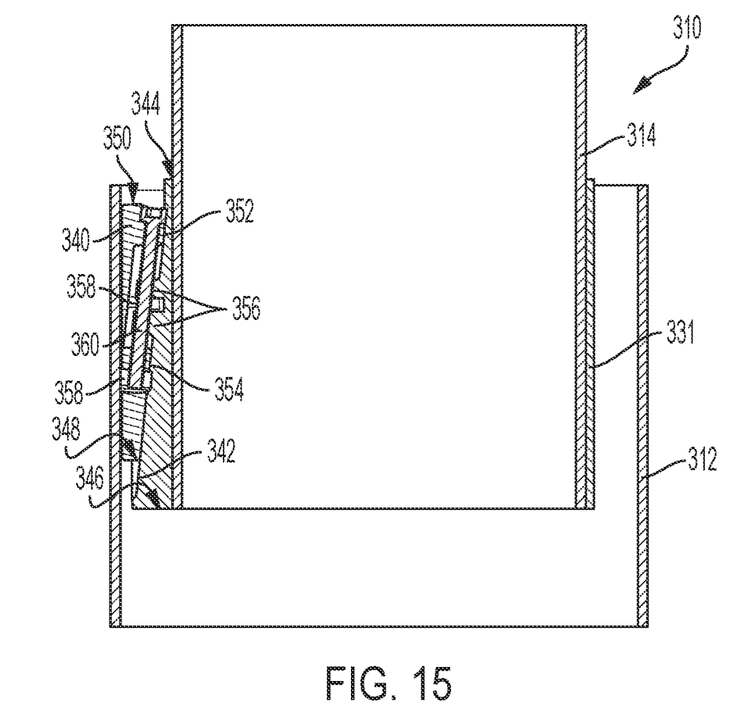
FIG. 15 illustrates a cross section of a third embodiment of a pedestal for a boat accessory.
Figure 16:
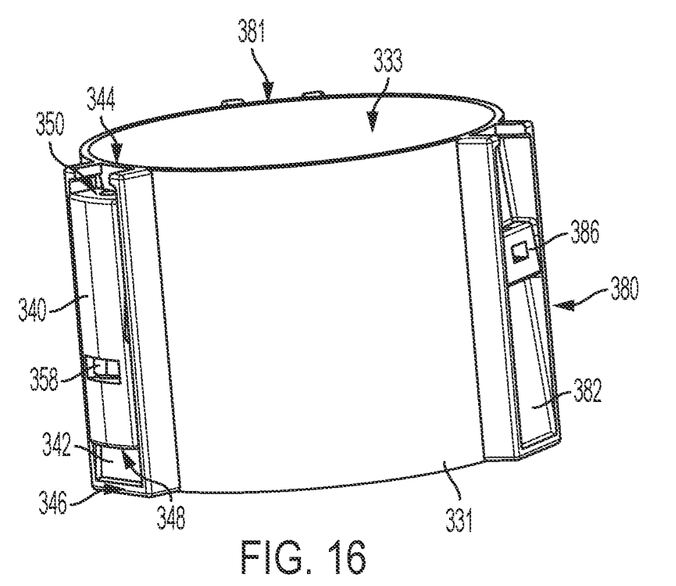
FIG. 16 illustrates a portion of the third embodiment of the pedestal shown in FIG. 15.

FIG. 15 illustrates a cross section through a portion of a third embodiment of a pedestal 310 according to the present disclosure. The pedestal 310 includes a hollow outer column 312 and an inner column 314 positioned within the outer column 312, wherein the inner and outer columns 314, 312 are longitudinally slidable with respect to one another. As with the first and second embodiments, one of the inner and outer columns (here the outer column 312) is configured to be connected to a supporting surface of a boat, and the other of the inner and outer columns (here, the inner column 314) is configured to be connected to a boat accessory. A sleeve 331 is provided between the inner column 314 and the outer column 312. The sleeve 331 is shown in FIG. 16 without the inner or outer column, it being understood that the inner column 314 would fit inside the circumferential opening 333 in the sleeve 331. The inner diameter of the sleeve 331 and the outer diameter of the inner column 314 are closely matched such that the sleeve 331 touches the entire outer circumference of the inner column 314.

Referring to both FIGS. 15 and 16, a plate 340 is captured between the inner and outer columns 314, 312. Additional plates are captured at different locations between the inner and outer columns 314, 312. Although these additional plates are not shown, one plate would be provided at location 380, and one plate would be provided at location 381, such that three plates are spaced relatively evenly around the sleeve 331. The plates 340 and at locations 380, 381 are situated adjacent wedge-shaped protrusions 342, 382 and at location 381, respectively, on an outer circumference of the sleeve 331. The wedge of each wedge-shaped protrusion 342, 382 and at location 381 is narrower at the top end than at the bottom end, such as shown by narrower top end 344 and wider bottom end 346 of wedge-shaped protrusion 342. The plates 340 and at locations 380, 381 have corresponding wedge-shaped surfaces that are narrower at the bottom end than at the top end, such as shown by narrower bottom end 348 and wider top end 350 of plate 340. As will be described below, the plates 340 and at locations 380, 381 are adjustable to create a frictional force between the inner and outer columns 314, 312 that prevents lateral movement therebetween. As with the first and second embodiments, rotation of a fastener moves the plate 340 to adjust the frictional force between the inner and outer columns 314, 312.

For example, referring to FIG. 15, by tightening a fastener such as bolt 360, which is accessible at its head, the wedge-shaped plate 340 is moved downward with respect to the pedestal 310. The bolt 360 runs through the plate 340 at ledges 352, 354 and through the sleeve 331 at ledge 356 (see similar ledge 386 at location 380) and is provided with nuts 358. Tightening the bolt 360 through bolt holes in ledges 352, 354, 356 and nuts 358 wedges a progressively wider portion of the wedge-shaped plate 340 against the wedge-shaped protrusion 342 on the sleeve 331. This wedging action increases frictional force between the plate 340 and the inner surface of the outer column 312. The same wedging action occurs upon tightening bolts in plates at locations 380 and 381. The plates 340 and at locations 380, 381 could be made of a material having a lower coefficient of friction than that of the inner and outer columns 314, 312, and the sleeve 331 in order to allow for smooth movement of the inner column 314 with respect to the outer column 312 under the power of the lifting actuator 22 or 122. Note that although the plates at locations 380, 381 are not described or shown herein, they are the same as plate 340 and are situated on wedge-shaped protrusions (e.g., 382 at location 380) of the sleeve 331 that are similar to wedge-shaped protrusion 342.

It should be understood that the inner and outer columns 314, 312 need not have cylindrical facing outer and inner surfaces, respectively. Rather, the columns 314, 312 could have any corresponding geometry, such as the geometry of the inner and outer columns 14, 12 of the first embodiment of the pedestal 10. In this instance, the sleeve 331 would also have the somewhat triangular shape of the outer surface of the inner column 314 and the inner surface of the outer column 312. The wedge-shaped protrusions 342, 382, and at location 381 would be located on the three planar surfaces of the sleeve 331.

Although the extender rod 288 and anti-buckling plate 290 are described with respect to only the embodiment of FIGS. 7-14, note that the same or a similar arrangement could be provided in the first embodiment of FIGS. 1-6 or the third embodiment of FIGS. 15 and 16. Alternatively, any of the embodiments can be provided with a lifting actuator suspended from the mounting plate connecting the outer column 12, 212, 312 to the supporting surface 20.

In the present description, certain terms have been used for brevity, clarity, and understanding. No unnecessary limitations are to be implied therefrom beyond the requirement of the prior art because such terms are used for descriptive purposes only and are intended to be broadly construed. The different systems described herein may be used alone or in combination with other systems. Various equivalents, alternatives, and modifications are possible within the scope of the appended claims.

What is claimed is:

1. A vertically adjustable pedestal for a boat accessory, the pedestal comprising:
   a hollow outer column;
   an inner column positioned within the outer column, wherein the inner and outer columns are slidable with respect to one another in a longitudinal direction of the pedestal;
   a first plate captured between the inner and outer columns at a first location, wherein the first plate is laterally adjustable with respect to the inner and outer columns to create a frictional force between the inner and outer columns that prevents lateral movement therebetween, wherein a surface of the first plate has first and second grooves therein extending in the longitudinal direction and laterally spaced from one another, and wherein a surface of one of the inner and outer columns that faces the surface of the first plate has third and fourth grooves therein extending in the longitudinal direction and laterally spaced from one another, the first and second grooves facing the third and fourth grooves, respectively;

a first rod extending in the longitudinal direction and captured within the first and third grooves;

a second rod extending in the longitudinal direction and captured within the second and fourth grooves;

a second plate captured between the inner and outer columns at a second location that is different from the first location; and a fastener contacting the first plate, wherein the fastener is configured such that rotation thereof moves the first plate laterally to cause the inner column to wedge against the second plate and thereby adjust the frictional force between the inner and outer columns;

wherein the first and second rods are made of a material with a lower coefficient of friction than a material of which the inner and outer columns are made; and wherein one of the inner and outer columns is configured to be coupled to a supporting surface of a boat, and the other of the inner and outer columns is configured to be coupled to the boat accessory.

2. The pedestal of claim 1, wherein the inner column has first and second planar outer surfaces extending in the longitudinal direction and facing respective first and second planar inner surfaces of the outer column that extend in the longitudinal direction.

3. The pedestal of claim 2, wherein the first plate is captured between the first planar outer surface and the first planar inner surface, and the second plate is captured between the second planar outer surface and the second planar inner surface.

4. The pedestal of claim 1, further comprising a lifting actuator, an extension tube of the lifting actuator being coupled to the inner column, the lifting actuator being configured to raise and lower the inner column with respect to the outer column.

5. The pedestal of claim 4, further comprising:

an extender rod coupled to an upper end of the extension tube and longitudinally aligned with the extension tube, the extender rod extending vertically above the upper end of the extension tube and being coupled between the extension tube and the inner column; and an anti-buckling plate coupled to the extender rod and having an outer perimeter, at least a portion of the outer perimeter abutting an inner perimeter of the inner column.

6. The pedestal of claim 5, wherein the anti-buckling plate has an aperture extending therethrough, the aperture being configured to receive the extender rod.

7. The pedestal of claim 6, wherein the aperture has a locating surface feature configured to align with a corresponding locating surface feature on an outside surface of the extender rod.

8. The pedestal of claim 5, further comprising a threaded adapter on the upper end of the extension tube, wherein the extender rod has a mating threaded surface configured to be connected to the threaded adapter.

9. The pedestal of claim 1, wherein a surface of the second plate has fifth and sixth grooves therein extending in the longitudinal direction and laterally spaced from one another, and wherein a surface of one of the inner and outer columns that faces the surface of the second plate has seventh and eighth grooves therein extending in the longitudinal direction and laterally spaced from one another, the fifth and sixth grooves facing the seventh and eighth grooves, respectively, and the pedestal further comprising:

a third rod extending in the longitudinal direction and captured within the fifth and seventh grooves; and a fourth rod extending in the longitudinal direction and captured within the sixth and eighth grooves;

wherein the third and fourth rods are made of a material having a lower coefficient of friction than the material of which the inner and outer columns are made.

10. The pedestal of claim 1, wherein the first plate is made of a material that is stiffer than a material of which the second plate is made.

11. A vertically adjustable pedestal for a boat accessory, the pedestal comprising:

a hollow outer column comprising at least first, second, and third inner surfaces extending in a longitudinal direction of the pedestal;

an inner column positioned within the outer column and comprising at least first, second, and third outer surfaces extending in the longitudinal direction and respectively facing the first, second, and third inner surfaces;

a first plate positioned between the first inner surface and the first outer surface, a second plate positioned between the second inner surface and the second outer surface, and a third plate positioned between the third inner surface and the third outer surface, wherein the first plate is laterally movable to wedge the second and third outer surfaces of the inner column against the respective second and third plates on the respective second and third inner surfaces of the outer column;

a fastener extending through one of the inner and outer columns and contacting the first plate, wherein the fastener is configured such that rotation thereof moves the first plate laterally;

a first rod extending in the longitudinal direction and captured between the first plate and the first outer surface within a first groove in the first plate and a second groove in the first outer surface; and a second rod extending in the longitudinal direction and captured between the first plate and the first outer surface within a third groove in the first plate and a fourth groove in the first outer surface, wherein the first and second rods are laterally spaced apart from one another;

wherein the first and second rods are configured to limit lateral and rotational movement of the inner and outer columns with respect to one another;

wherein the first and second rods are made of a material with a lower coefficient of friction than a material of which the inner and outer columns are made;

wherein the inner and outer columns are slidable with respect to one another in the longitudinal direction; and wherein one of the inner and outer columns is configured to be coupled to a supporting surface of a boat, and the other of the inner and outer columns is configured to be coupled to the boat accessory.

12. The pedestal of claim 11, further comprising a lifting actuator, an extension tube of the lifting actuator being coupled to the inner column, the lifting actuator being configured to raise and lower the inner column with respect to the outer column.

13. The pedestal of claim 12, further comprising:

an extender rod coupled to an upper end of the extension tube and longitudinally aligned with the extension tube, the extender rod extending vertically above the upper end of the extension tube and being coupled between the extension tube and the inner column; and an anti-buckling plate coupled to the extender rod and having an outer perimeter, at least a portion of the outer perimeter abutting an inner perimeter of the inner column.

14. The pedestal of claim 13, wherein the anti-buckling plate has an aperture extending therethrough, the aperture being configured to receive the extender rod.

15. The pedestal of claim 14, wherein the aperture has a locating surface feature configured to align with a corresponding locating surface feature on an outside surface of the extender rod.

16. The pedestal of claim 13, further comprising a threaded adapter on the upper end of the extension tube, wherein the extender rod has a mating threaded surface configured to be connected to the threaded adapter.

17. The pedestal of claim 11, wherein the second and third plates are not laterally movable.

18. The pedestal of claim 11, wherein the fastener extends through the outer column, and a head of the fastener is accessible from outside the pedestal.

19. A vertically adjustable pedestal for a boat accessory, the pedestal comprising:
- a hollow outer column;
- an inner column positioned within the outer column, wherein the inner and outer columns are longitudinally slidable in a longitudinal direction with respect to one another, and wherein the inner column is configured to be coupled to the boat accessory, and the outer column is configured to be coupled to a supporting surface of a boat;
- a lifting actuator, an extension tube of the lifting actuator being coupled to the inner column for raising and lowering the inner column with respect to the supporting surface of the boat;
- an extender rod coupled to an upper end of the extension tube and longitudinally aligned with the extension tube, the extender rod extending vertically above the upper end of the extension tube and being coupled between the extension tube and the inner column;
- an anti-buckling plate coupled to the extender rod and having an outer perimeter, at least a portion of the outer perimeter abutting an inner perimeter of the inner column;
- a first plate captured between the inner and outer columns, wherein the first plate is laterally adjustable with respect to the inner and outer columns to create a frictional force between the inner and outer columns that prevents lateral movement therebetween, wherein a surface of the first plate has first and second grooves therein extending in the longitudinal direction and laterally spaced from one another, and wherein a surface of one of the inner and outer columns that faces the surface of the first plate has third and fourth grooves therein extending in the longitudinal direction and laterally spaced from one another, the first and second grooves facing the third and fourth grooves, respectively;
- a first rod extending in the longitudinal direction and captured within the first and third grooves;
- a second rod extending in the longitudinal direction and captured within the second and fourth grooves;
- a second plate captured between the inner and outer columns; and
- a fastener contacting the first plate, wherein the fastener is configured such that rotation thereof moves the first plate laterally to cause the inner column to wedge against the second plate and thereby adjust the frictional force between the inner and outer columns;
- wherein the first and second rods are made of a material with a lower coefficient of friction than a material of which the inner and outer columns are made.

\* \* \* \* \*